United States Patent
Asao et al.

(10) Patent No.: US 6,435,732 B1
(45) Date of Patent: Aug. 20, 2002

(54) OPTICAL CONNECTOR

(75) Inventors: Kazuhiro Asao, Yokkaichi; Toshihiro Nakae, Osaka, both of (JP)

(73) Assignees: Sumitomo Wiring Systems, Ltd., Mie; Sumitomo Electric Industries, Ltd., Osaka, both of (JP)

( * ) Notice: Subject to any disclaimer, the term of this patent is extended or adjusted under 35 U.S.C. 154(b) by 0 days.

(21) Appl. No.: 09/935,598

(22) Filed: Aug. 24, 2001

(30) Foreign Application Priority Data

Sep. 28, 2000 (JP) .................................... P2000-296004

(51) Int. Cl.[7] .................................................. G02B 6/36
(52) U.S. Cl. .......................................... 385/78; 439/455
(58) Field of Search .............................. 385/76, 78, 88, 385/89, 90, 91, 92, 93, 94, 95, 147; 439/455

(56) References Cited

U.S. PATENT DOCUMENTS 4,657,340 A * 4/1987 Tanaka et al. ................. 385/78

FOREIGN PATENT DOCUMENTS

JP    A 2000-147301    5/2000

* cited by examiner

*Primary Examiner*—Neil Abrams
*Assistant Examiner*—Javaid Nasri
(74) *Attorney, Agent, or Firm*—Oliff & Berridge, PLC

(57) ABSTRACT

An optical connector for a two-core optical fiber cord 1 is constructed by coupling a housing main body portion for holding ferrule portions 5 fitted to top end portions of paired optical fiber cores 2 with a cord receiving portion 30 for holding an end portion of a covering member 3. The cord receiving portion 30 includes paired cord receiving split members 31A, 31B, and core-guiding-path forming concave portions 33A, 33B for guiding paired optical fiber cores 2 to the outside are formed in the cord receiving split members 31A, 31B. Paired guiding pins 34A, 34B for guiding paired optical fiber cores 2 to separate into an almost Y-shape are formed in the core-guiding-path forming concave portions 33A, 33B, and holding pieces 22 used to couple the housing main body portion with the cord receiving portion 30 can be prevented from contacting to the optical fiber cores 2.

4 Claims, 7 Drawing Sheets

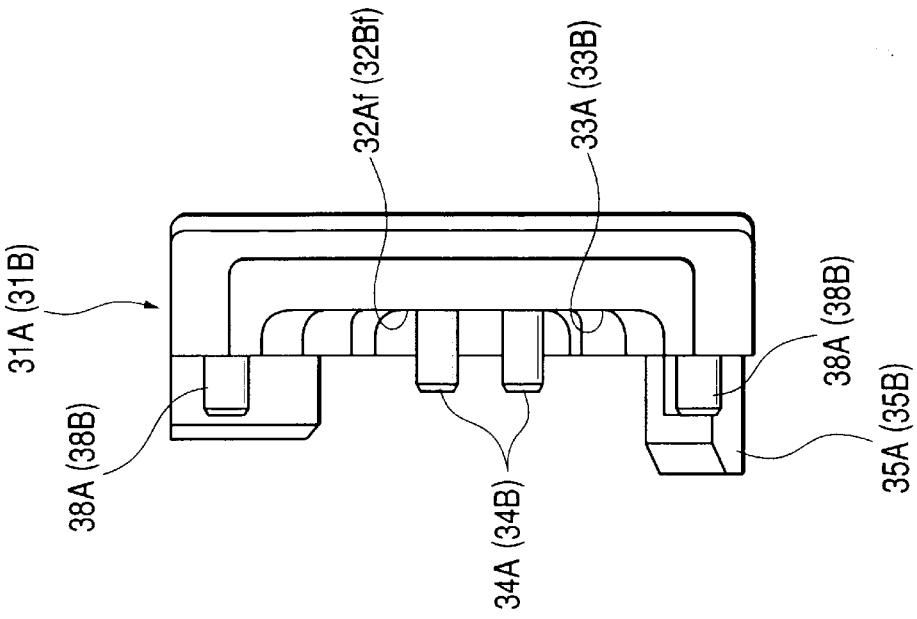
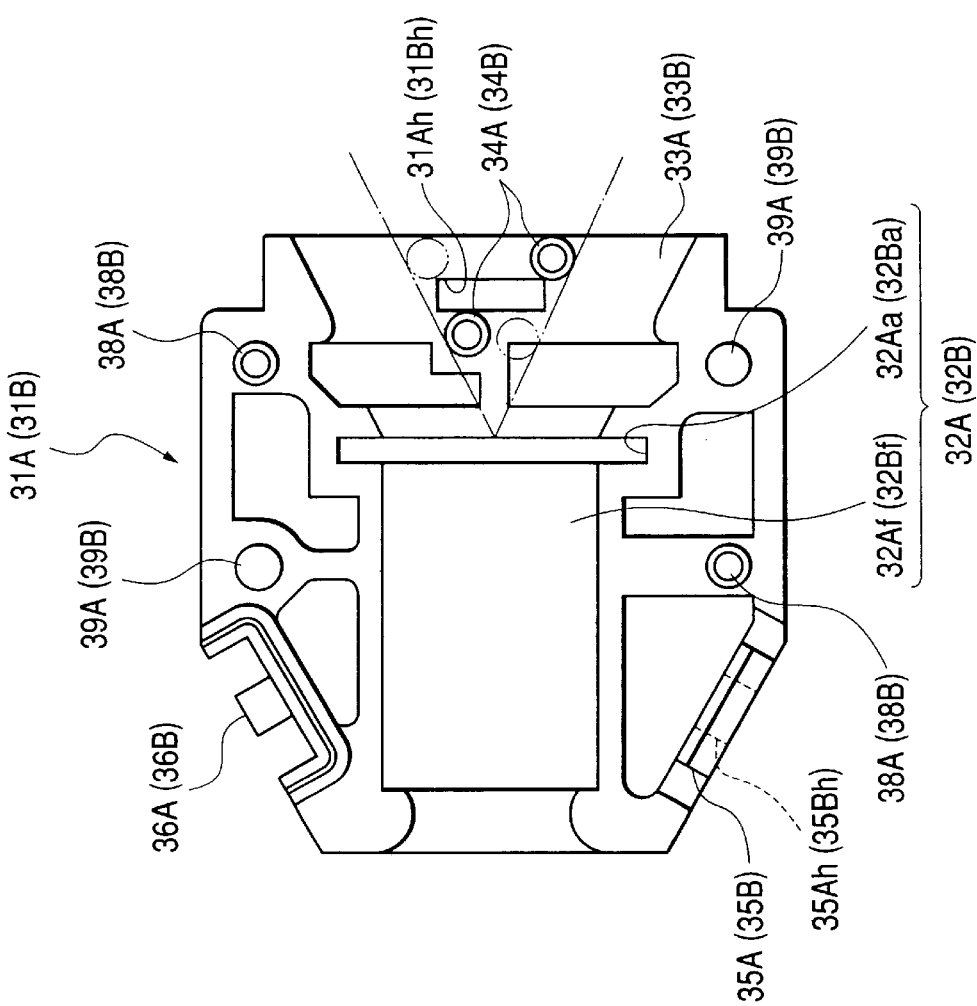

OPTICAL CONNECTOR

BACKGROUND OF THE INVENTION

1. Field of the Invention

The present invention relates to an optical connector employed to connect optical fibers or the optical fiber and an optical element.

2. Description of the Related Art

In the prior art, there are the optical connectors shown in FIGS. 7 to 9 as the two-core optical connector.

This optical connector 100 includes a housing main body portion 101, and a boot body 110 coupled to the rear side of the housing main body portion 101.

The housing main body portion 101 is made up of a housing casing portion 102 formed like a casing whose rear side and upper side can be opened, and a housing lid portion 103 fitted to close the upper opening of the housing casing portion 102. The housing main body portion 101 is formed such that ferrule portions 120 fitted to end portions of the optical fiber cores 131 respectively can be arranged and installed therein. Also, the boot body 110 is coupled to the rear portion of the housing main body portion 101 in the situation that it holds a pair of optical fibers 130 inserted therein.

The assembling of the optical connector 100 is carried out as follows.

First, a pair of optical fibers 130 are inserted into the boot body 110 and then pulled out forwardly therefrom. Then, optical fiber cores 131 are exposed by stripping off covering members at top end portions of the optical fiber cords 130. Then, the exposed top end portions of the optical fiber cores 131 are inserted in the ferrule portions 120 and fixed thereto. Then, the ferrule portions 120 are arranged in parallel in the housing casing portion 102 and then the boot body 110 is positioned in the rear opening of the housing casing portion 102. In this state, the housing lid portion 103 is fitted to close the upper opening of the housing casing portion 102. At this time, a holding piece 104 provided downward vertically from the rear end portion of the housing lid portion 103 is inserted into a slit portion 111 formed at the front end portion of the boot body 110. Accordingly, the boot body 110 is fixed to and held by the housing main body portion 101.

Meanwhile, in the optical connector 100 described above, in the case that the two-core optical connector in which the covering member is formed around a pair of optical fiber cores is employed, a pair of optical fiber cores exposed at the top end side of the optical fiber cords are moved toward the center of the boot body 110 in the width direction when the boot body 110 is fitted into the rear opening of the housing casing portion 102 in the situation that the optical fiber cords are inserted into the boot body 110. Therefore, there is the possibility that, when the housing lid portion 103 is fitted to close the upper opening of the housing casing portion 102, top end portion of the holding piece 104 is pushed against the optical fiber cores by the strong force and thus the optical fiber cores are damaged.

SUMMARY OF THE INVENTION

Therefore, it is an object of the present invention to provide an optical connector capable of preventing damage of optical fiber cores in assembling steps.

To achieve the above object, according to a first aspect of the invention, there is provided an optical connector comprising a housing main body portion for installing and holding a pair of ferrule portions fitted to top end portions of a pair of optical fiber cores, which are exposed from a top end portion of a two-core optical fiber cord, respectively in a predetermined parallel manner; and a cord receiving portion coupled to a base end side of the housing main body portion, for holding an end portion of a covering member of the optical fiber cord; wherein the housing main body portion includes a housing casing portion formed like a casing whose end side coupled to the cord receiving portion and upper side are opened and which can hold the pair of ferrule portions therein in the predetermined parallel manner, and a housing lid portion for closing an upper opening of the housing casing portion, whereby holding pieces formed on end sides of the housing casing portion or the housing lid portion coupled to the cord receiving portion are inserted into holding-piece passing holes formed in the cord receiving portion at positions between a pair of optical fiber cores that are led from the cord receiving portion to the housing main body portion such that a coupled state between the housing main body portion and the cord receiving portion is maintained, and the cord receiving portion includes a pair of cord receiving split members each having cord holding concave portions for receiving and holding an end portion of a covering portion of the optical fiber cord respectively and core-guiding-path forming concave portions for leading the pair of optical fiber cores, that are extended from a top end portion of the optical fiber cord received and held in the cord holding concave portions, to an outside, and the holding-piece passing holes into which the holding pieces are passed therethrough are formed at portions that correspond to the core-guiding-path forming concave portions in the cord receiving split members, and a pair of guiding pins for guiding the pair of optical fiber cores, that are extended from a top end portion of the optical fiber cord received and held in the cord holding concave portions, to positions not to interfere with the holding pieces, that are inserted into the holding-piece passing holes to pass through a space between the core-guiding-path forming concave portions, are provided to the core-guiding-path forming concave portions to protrude therefrom.

Also, according to a second aspect of the invention, preferably the pair of guiding pins in the core-guiding-path forming concave portions are formed at positions, that do not interfere with each other in a coupled state of the cord receiving split members by shifting them in a longitudinal direction of the cord receiving split members, and also have a height to reach inner peripheral surfaces of the core-guiding-path forming concave portions that oppose to each other in the coupled state of the cord receiving split members.

Also, according to a third aspect of the invention, preferably structures having a same shape and a same size are employed as the pair of cord receiving split members.

In addition, according to a fourth aspect of the invention, preferably outer peripheral portions of top end portions of the guiding pins are chamfered.

BRIEF DESCRIPTION OF THE DRAWINGS

FIG. 6A is a plan view of a cord receiving split member, and FIG. 6B is a front view of the cord receiving split member.

DETAILED DESCRIPTION OF THE PREFERRED EMBODIMENTS

Figure 1:
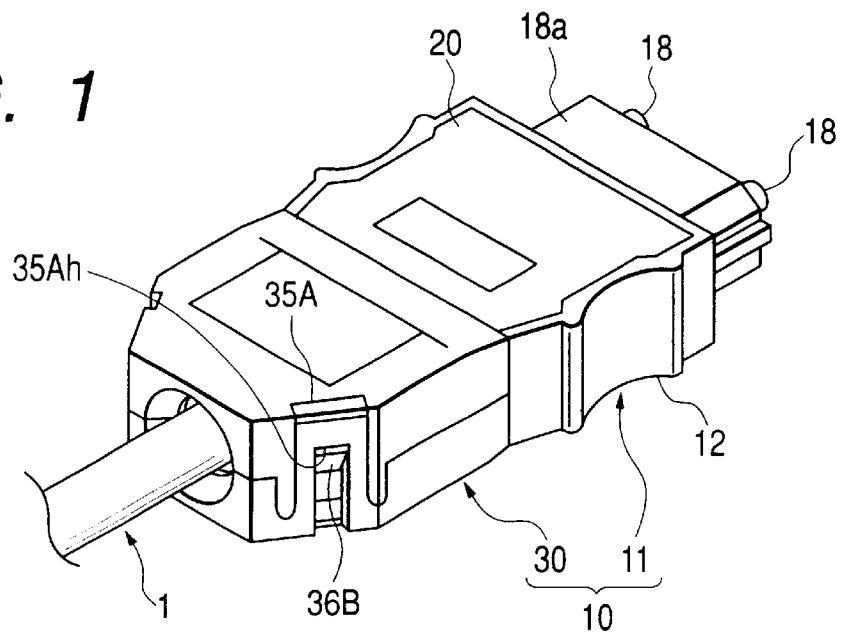
FIG. 1 is a perspective view showing an optical connector according to an embodiment of the present invention.

An optical connector according to an embodiment of the present invention will be explained hereinafter.

As shown in FIGS. 1 to 5, an optical connector 10 is the optical connector which is fitted to an end portion of an optical fiber cord 1 and which is constructed by coupling a housing main body portion 11 and a cord receiving portion 30.

Here, a two-core type optical fiber cord in which a covering member 3 is formed around a pair of optical fiber cores 2 is assumed as an optical fiber cord 1, and a pair of optical fiber cores 2 are exposed over a predetermined length by stripping off the covering member 3 at the end portions previously at the predetermined length. Also, a cord disconnection preventing jig 4, in which an externally- extended guard portion 4b is provided to one end of a cylindrical portion 4a, is fitted to the end portion of the covering member 3 by the method such as the caulking, etc. As described in detail later, the disconnection preventing and the holding of the optical fiber cord 1 can be achieved at the receiving portion 30 by using the cord disconnection preventing jig 4 (see FIGS. 2 and 3). In addition, ferrule portions 5 are fitted to end portions of the optical fiber cores 2 respectively. Each of the ferrule portion 5 is constructed such that a guard portion 7 is formed in the almost center portion of a almost cylindrical ferrule main body portion 6 in the longitudinal direction and that a coil spring 8 is wound on the ferrule main body portion 6 on the rear side of the guard portion 7. Then, the optical fiber cores 2 are inserted in and fixed to ferrule main body portions 6 respectively (see FIGS. 2 to 5).

Figure 4:
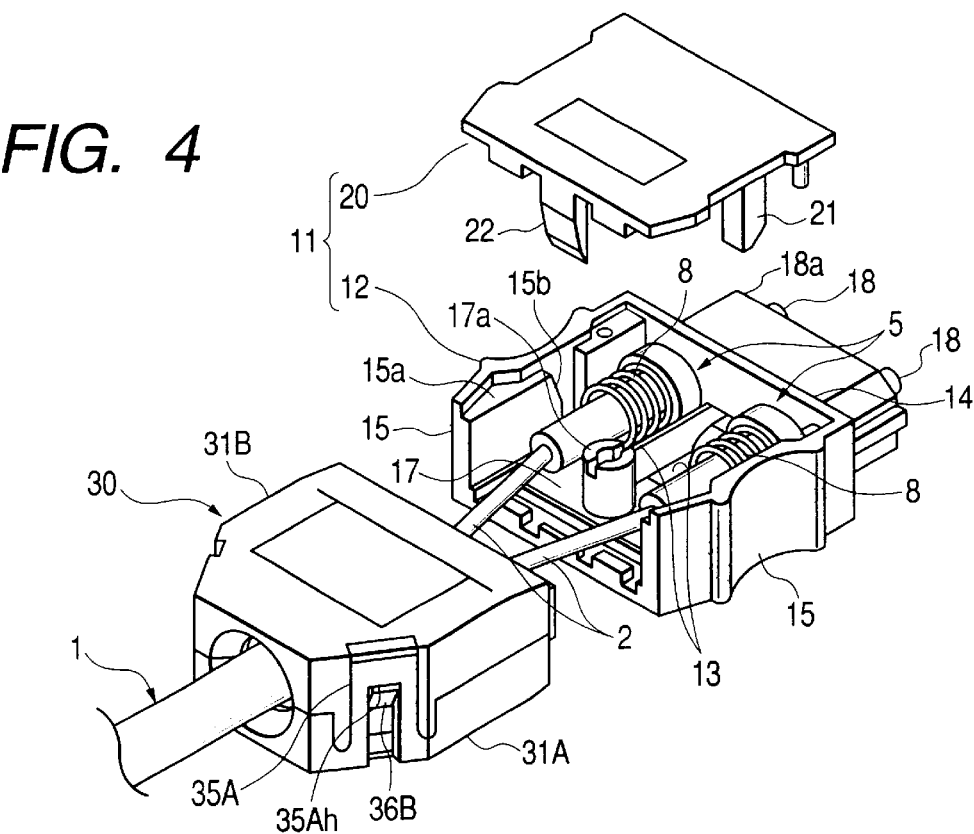
FIG. 4 is a perspective view showing still another assembling step of the above optical connector.
Figure 5:
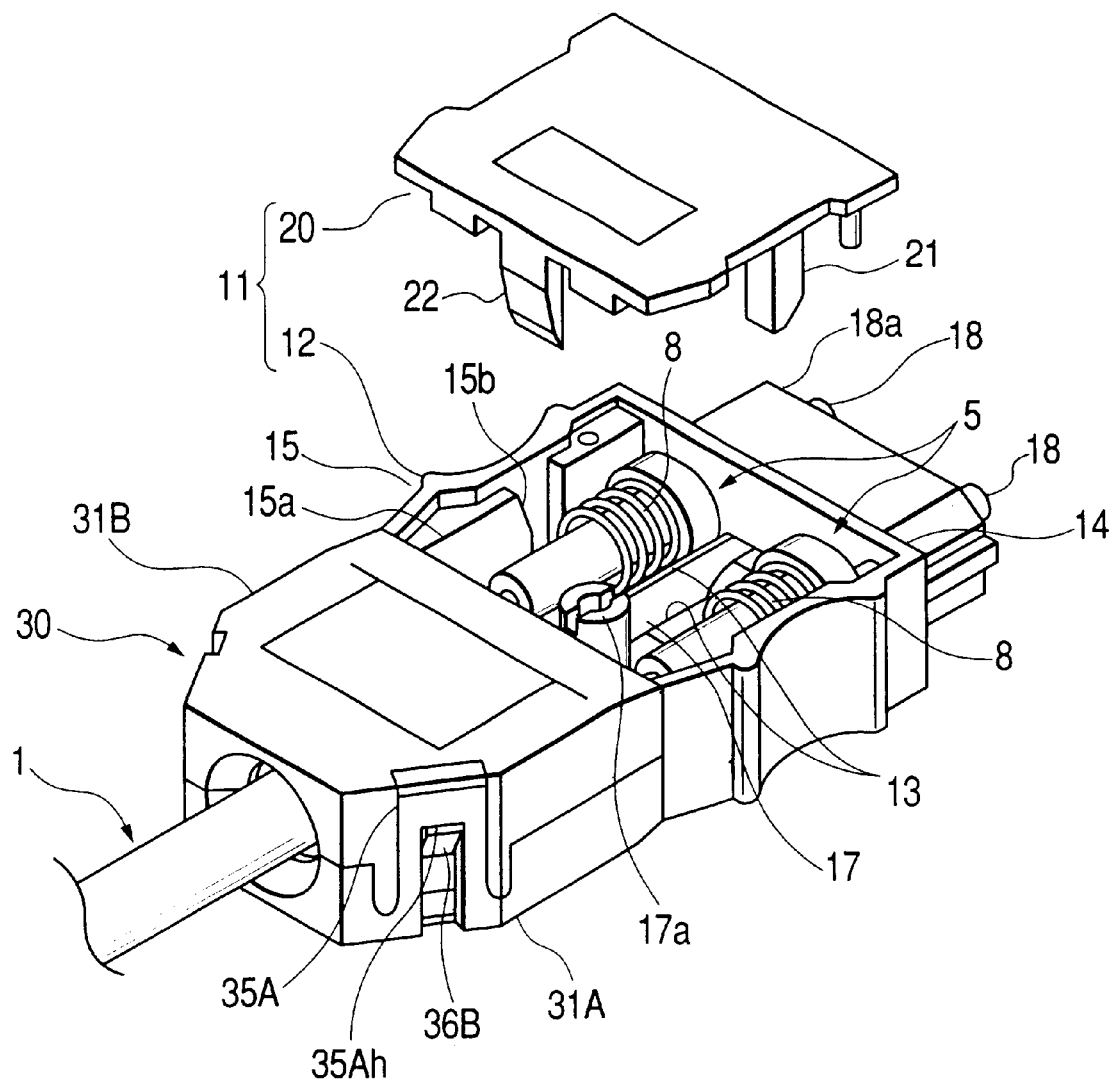
FIG. 5 is a perspective view showing yet still another assembling step of the above optical connector.
Figure 7:
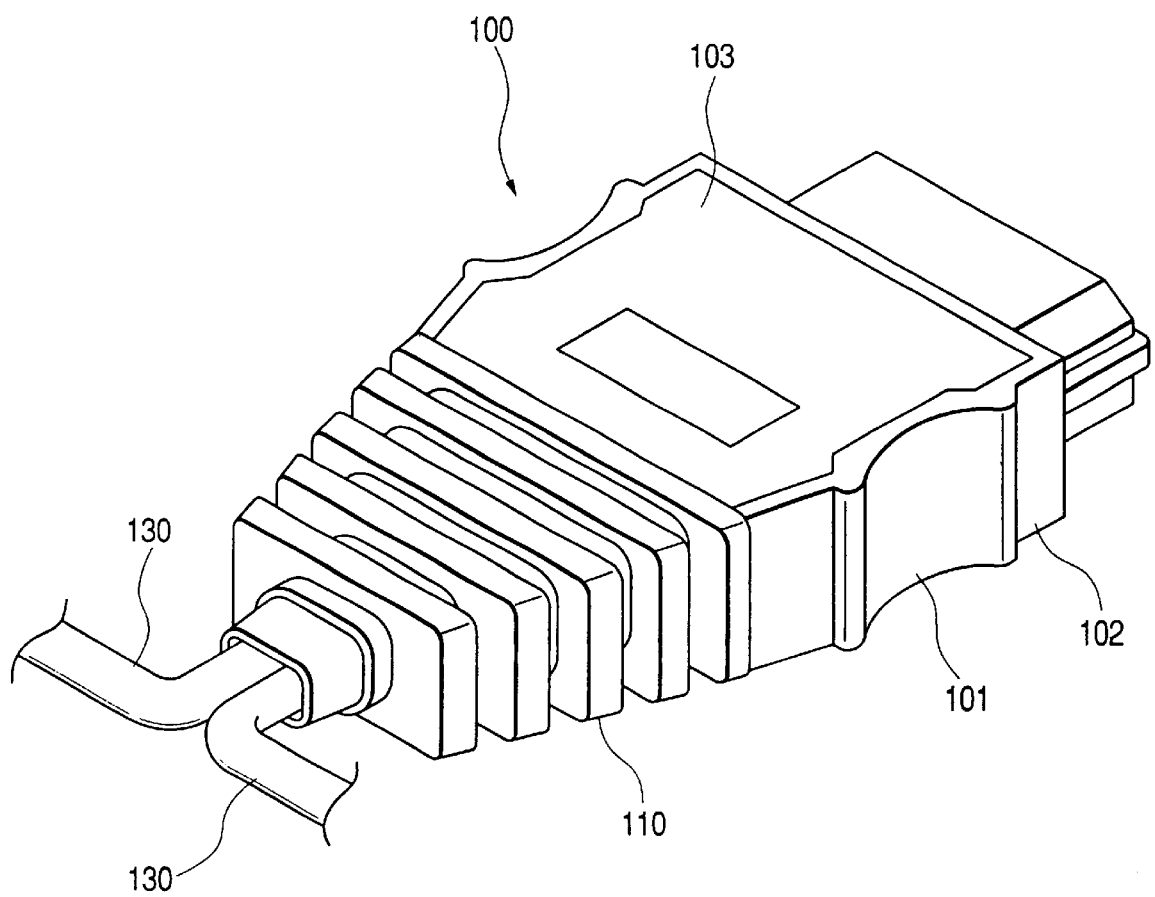
FIG. 7 is a perspective view showing an optical connector in the prior art.
Figure 8:
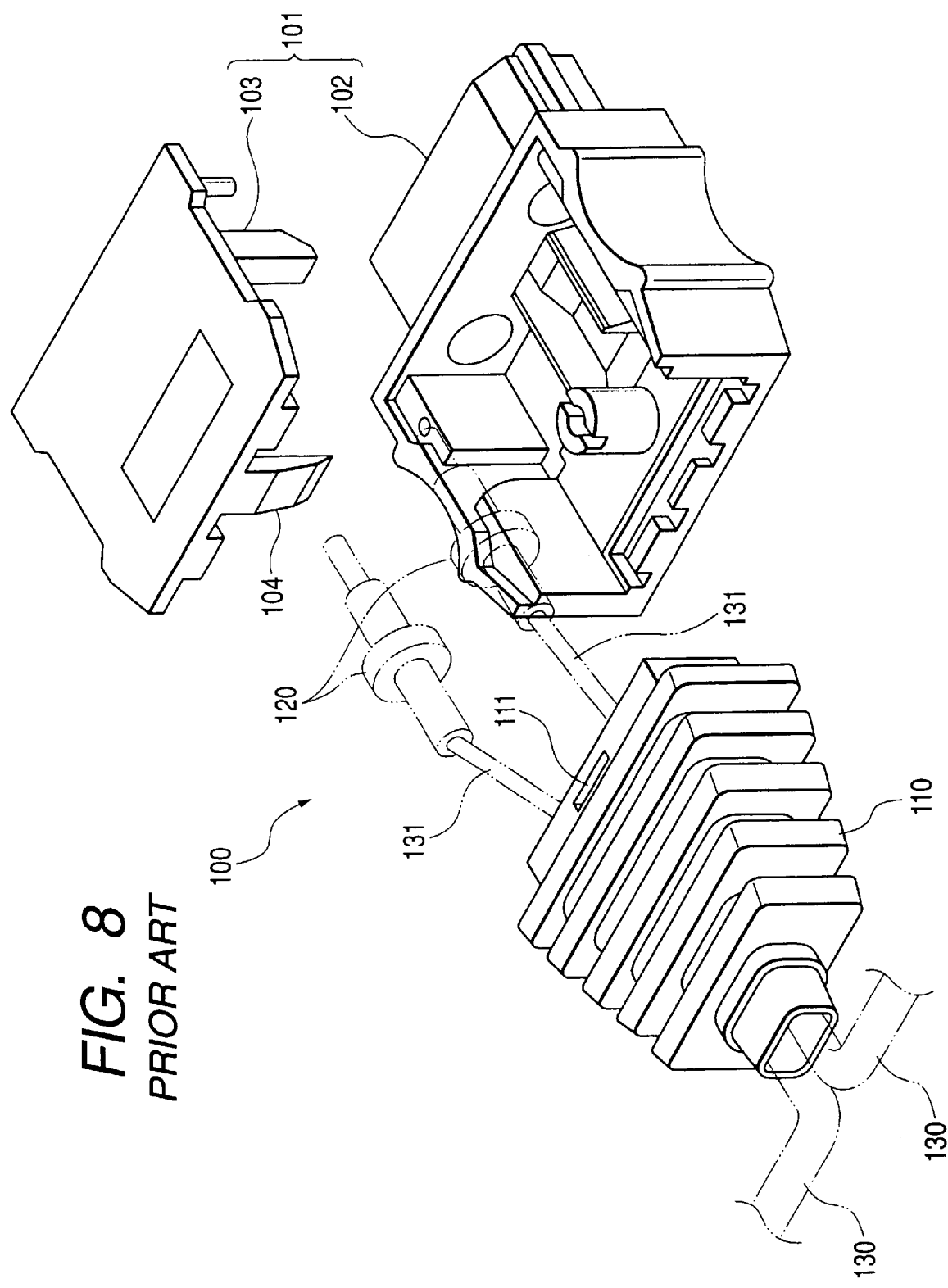
FIG. 8 is a perspective view showing an assembling step of the optical connector in the prior art.
Figure 9:
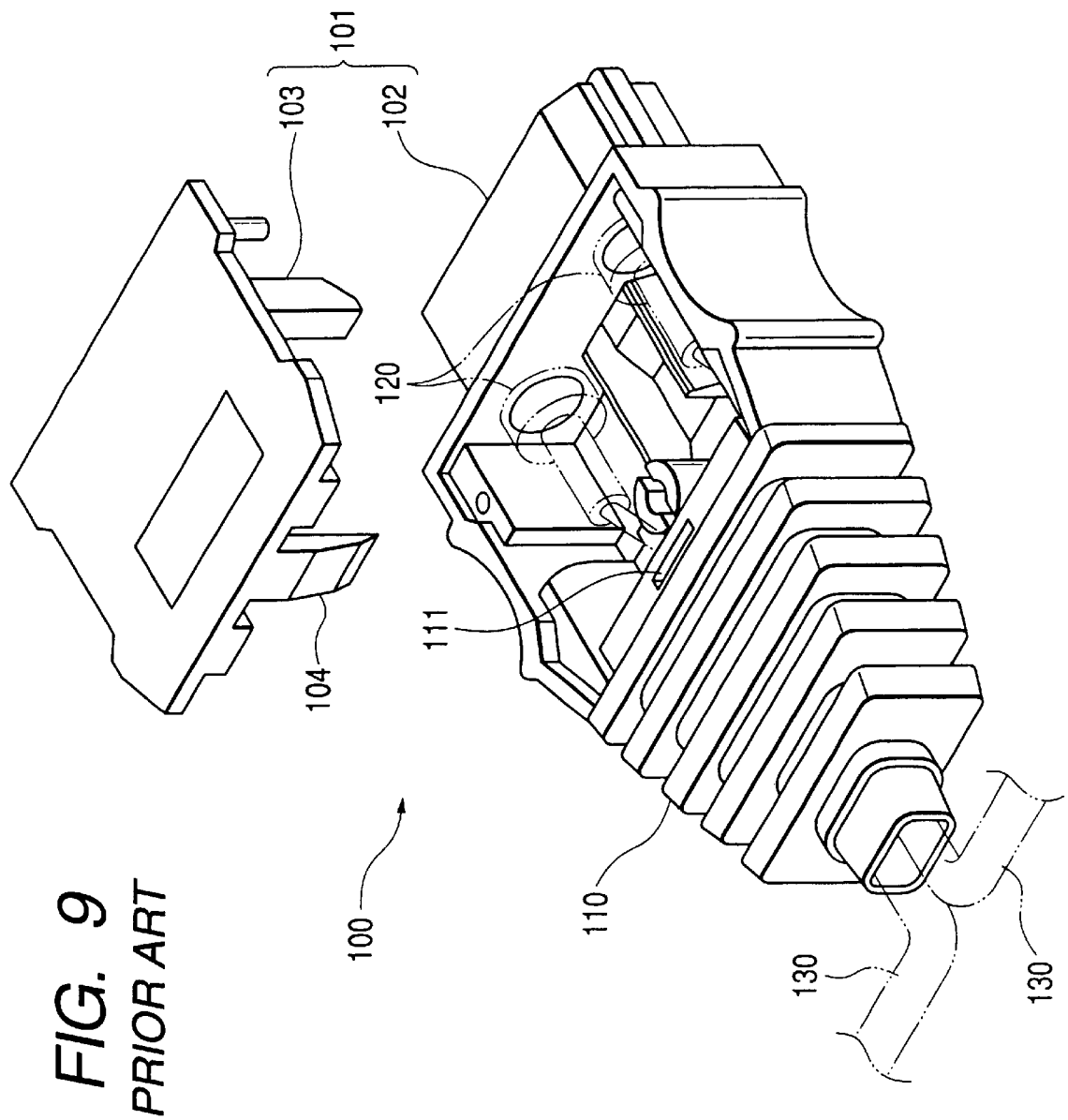
FIG. 9 is a perspective view showing another assembling step of the optical connector in the prior art.

As shown in FIGS. 1, 4 and 5, the housing main body portion 11 is composed of a combination of a housing casing portion 12 and a housing lid portion 20.

The housing casing portion 12 is formed like a casing whose rear portion (end side coupled to the receiving portion 30) and upper portion are opened, and is also formed such that a pair of ferrule portions 5 can be installed therein in a predetermined parallel manner.

More particularly, a pair of concave portions 13 into which a rear end portion of the ferrule portion 5 can be installed respectively are formed in the inside of the housing casing portion 12. Also, a pair of connecting cylindrical portions 18 into which the front end portion of the ferrule main body portion 6 can be inserted respectively are formed on the front surface side of a front wall portion 14 so as to protrude there from. Also, a protection cover 18a is formed to cover the connecting cylindrical portions 18. Then, when rear end portions of the ferrule portions 5 are pushed into the concave portions 13 such that the front end portions of the ferrule main body portions 6 can be inserted into the connecting cylindrical portions 18 from the inside of the housing casing portion 12, the ferrule portions 5 can be installed in a predetermined parallel manner. At this time, coil springs 8 that are wound on the rear end portions of the ferrule main body portions 6 are interposed in their compressed state between the guard portions 7 and rear stepped portions of the concave portions 13 respectively. As a result, the ferrule portions 5 are pushed forward against the housing casing portion 12. When the present optical connector 10 is connected to the destination connector (not shown), the connecting cylindrical portions 18 are guided and inserted into guiding holes of the destination connector. Thus, the optical fiber cord 1 is positioned in the inside of the optical connector 10 to oppose to an end surface of the optical fiber and a light receiving surface or a light emitting surface of the optical element in the destination connector, and also the optical coupling between them can be established.

Also, stepped portions 15a that are lowered downward from upper end surfaces of side wall portions 15 by a thickness of the housing lid portion 20 respectively are formed on the inner surface sides of both side wall portions 15 of the housing casing portion 12 respectively. Also, a cylindrical portion 17a is provided vertically upward from the slightly rear position between the pair of concave portions 13 on an upper surface of a bottom surface portion 17 in the housing casing portion 12. Then, when the housing lid portion 20 is fitted to the upper opening of the housing casing portion 12, a lower surface of the housing lid portion 20 comes into contact with the stepped portions 15a on both sides and also a substantially central lower surface of the housing lid portion 20 comes into contact with a top end surface of the cylindrical portion 17a, so that the downward drop and the deflective deformation of the housing lid portion 20 can be prevented.

Also, guiding recess portions 15b are formed along the vertical direction in intermediate portions of inner surface sides of both side wall portions 15 of the housing casing portion 12 in the longitudinal direction. Guiding plate portions 21 (described later) formed on the housing lid portion 20 are inserted into and guided by the guiding recess portions 15b respectively.

Also, the housing lid portion 20 is formed like a plate to fit into the upper opening of the housing casing portion 12. The housing lid portion 20 is formed to close/open the upper opening of the housing casing portion 12 in the conditions that it can press down and hold the ferrule portions 5, that are fitted and arranged in the housing casing portion 12, therein.

A pair of guiding plate portions 21 that can be inserted into the guiding recess portions 15b respectively are provided vertically on both side portions of the lower surface of the housing lid portion 20. When the housing lid portion 20 is fitted to the upper opening of the housing casing portion 12, the guiding plate portions 21 are inserted into the guiding recess portions 15b to guide and thus the housing lid portion 20 can be pushed down straightly to close the upper opening of the housing casing portion 12. In this case, for example, if engaging convex portions (not shown) are formed on end portions of the guiding plate portions 21 and then the engaging convex portions are caused to engage with the housing casing portion 12 side, the housing lid portion 20 can be fitted to and held by the housing casing portion 12.

Also, plate-like holding pieces 22 are provided vertically to the rear end portion of the lower surface of the housing lid portion 20. The holding pieces 22 have a length to such extent that they can reach the upper surface of the bottom surface portion 17 of the housing casing portion 12 in the situation that the housing lid portion 20 is fitted into the upper opening of the housing casing portion 12. Also, the holding pieces 22 can be inserted into holding-piece passing holes 31A*h*, 31B*h* (described later), that are formed in both cord receiving split members 31A, 31B of the cord receiving portion 30, in the situation that the front end portion of the cord receiving portion 30 is fitted to and arranged in the rear opening of the housing casing portion 12. In addition, the holding pieces 22 are provided vertically at the almost central position of the housing lid portion 20 in the width direction to pass through between the optical fiber cores 2 that are extended from the cord receiving portion 30 to the housing main body portion 11.

In the present embodiment, since the holding pieces 22 are finished like a plate that its thickness is reduced gradually toward its top end side, they can be easily inserted into the holding-piece passing holes 31A*h*, 31B*h*.

As shown in FIGS. 1 to 6, the cord receiving portion 30 has a flat casing shape whose planar shape is constructed by coupling a base of the trapezoid to one long side of the rectangle as a whole shape. The cord receiving portion 30 consists of a pair of cord receiving split members 31A, 31B that can be split into two upper and lower pieces along its flat direction (the direction in parallel with the ferrule portions 5).

The cord receiving split members 31A, 31B have the same shape and the same size if one of them is turned upside down. Cord holding concave portions 32A, 32B are formed at the rear portions of the cord receiving split members 31A, 31B and core-guiding-path forming concave portions 33A, 33B are formed at the front portions of the cord receiving split members 31A, 31B.

The cord holding concave portions 32A, 32B include cord passing portion 32A*f*, 32B*f* each having an almost semicircular peripheral shape in which the covering portion 3 of the optical fiber cord 1 is fitted, and groove portions 32A*a*, 32B*a* which are formed at front end portions of the cord passing portion 32A*f*, 32B*f* and into which the guard portion 4*b* of the cord disconnection preventing jig 4 can be fitted.

Then, if the cord receiving split members 31A, 31B are coupled with each other by arranging the end portions of the covering portion 3 of the optical fiber cord 1 between the cord holding concave portions 32A, 32B to fit the guard portions 4*b* into the groove portions 32A*a*, 32B*a*, the optical fiber cord 1 can be held by the cord receiving portion 30 not to disconnect therefrom.

The core-guiding-path forming concave portions 33A, 33B are formed like the groove that extends successively to the front of the cord passing portion 32A*f*, 32B*f*. The core-guiding-path forming concave portions 33A, 33B have a semi-elliptic sectional shape that is flat in the width direction of the cord receiving portion 30, and the groove width is formed to extend gradually forward in the width direction of the cord receiving portion 30. Then, in the state that a pair of cord receiving split members 31A, 31B are coupled with each other, a pair of optical fiber cores 2 that are exposed from the end portions of the optical fiber cords 1, which are held in the cord holding concave portions 32A, 32B, are guided forward to the cord receiving portion 30 while expanding like an almost Y-shape in the width direction to pass through between the core-guiding-path forming concave portions 33A, 33B.

Also, outer surfaces of the front end portions of the cord receiving split members 31A, 31B are formed to slightly become depressed to the inside rather than the rear side portions, and thus are installed into the rear end portion of the housing casing portion 12. Also, the holding-piece passing holes 31A*h*, 31B*h* into which the holding pieces 22 are inserted are formed at the center portion of the front end portions (portions corresponding to the core-guiding- path forming concave portions 33A, 33B) of the cord receiving split members 31A, 31B in the width direction. Then, when the cord receiving split members 31A, 31B are coupled with each other and then the housing lid portion 20 is fitted into the upper opening of the housing casing portion 12 in the state that the front end portion of the cord receiving portion 30 is fitted into the rear opening of the housing casing portion 12, the holding pieces 22 are inserted into the holding-piece passing hole 31B*h* of the upper cord receiving split member 31B and then are inserted into the holding-piece passing hole 31A*h* of the lower cord receiving split member 31A to pass through the center area of the space formed between the core-guiding-path forming concave portions 33A, 33B in the width direction. Accordingly, the coupling state between the housing main body portion 11 and the cord receiving portion 30 can be held.

Also, a pair of guiding pins 34A, 34B that are directed to the inner peripheral surfaces of the mutually-opposed core-guiding-path forming concave portions 33A, 33B are provided to the core-guiding-path forming concave portions 33A, 33B respectively to protrude therefrom. A pair of guiding pins 34A, 34B of the core-guiding-path forming concave portions 33A, 33B are provided at positions near both side portions of the holding-piece passing holes 31A*h*, 31B*h* to protrude therefrom. The guiding pins 34A, 34B have a function of guiding a pair of optical fiber cores 2 that are extended from the top end portion of the optical fiber cords 1 to put in two portions on both sides of the holding-piece passing holes 31A*h*, 31B*h* and also guiding them to the positions at which they do not interfere with the holding pieces 22 to be inserted into the holding-piece passing holes 31A*h*, 31B*h* (see a dot-dash line in FIG. 6A).

Also, a pair of guiding pins 34A, 34B of the core guiding-path forming concave portions 33A, 33B are provided at positions, that are shifted to the longitudinal direction of the holding-piece passing holes 31A*h*, 31B*h* along the axis direction of the cord receiving portion 30, to protrude the refrom. When both cord receiving split members 31A, 31B are coupled with each other, a pair of guiding pins 34A on the cord receiving split member 31A side and a pair of guiding pins 34B on the cord receiving split member 31B side are positioned not to interfere mutually. Then, if the guiding pins 34A, 34B are finished to have such a height that reaches inner peripheral surfaces of the mutually-opposed core- guiding-path forming concave portions 33A, 33B after such structures are employed, the optical fiber cores 2 can be guided more surely by any of a pair of guiding pins 34A or a pair of guiding pins 34B.

In this case, the above guiding pins 34A, 34B are formed like a substantially circular cylinder and also outer circular peripheral portions of their top end portions are chamfered. Therefore, even if the top end portions of the guiding pins 34A, 34B are brought into contact with the optical fiber cores 2 at the time when the cord receiving split members 31A, 31B are coupled with each other, the optical fiber cores 2 contact to slide along the chamfered outer circular peripheral portions of the top end portions of the above guiding pins 34A, 34B and escape smoothly to the out side.

Also, engaging pieces 35A, 35B having engaging holes 35A*h*, 35B*h* are formed on one side portion of the rear end portions of the cord receiving split members 31A, 31B. Also, engaging convex portions 36A, 36B which can engage with engaging holes 35A*h*, 35B*h* in the engaging pieces 35A, 35B are formed on the other side portion of the rear end portions of the cord receiving split members 31A, 31B.

When the cord receiving split members 31A, 31B are coupled mutually to oppose to each other, the engaging piece 35A of the cord receiving split member 31A positioned on one side is caused to engage with the engaging convex portion 36B of the cord receiving split member 31B positioned on the other side, and also the engaging piece 35B of the cord receiving split member 31B positioned on the other side is caused to engage with the engaging convex portion 36A of the cord receiving split member 31A positioned on one side, so that the coupling mode of both cord receiving split members 31A, 31B can be maintained.

In addition, two positioning convex portions 38A, 38B and two positioning concave portions 39A, 39B are formed at four outer peripheral portions on coupled surfaces of the cord receiving split members 31A, 31B respectively. The positioning convex portions 38A, 38B are formed at the rear position of one side portion (the right side portion in FIG. 6A) of the cord receiving split members 31A, 31B and the front position of the other side portion (the left side portion in FIG. 6B) respectively. The positioning concave portions 39A, 39B are formed at the front position of one side portion of the cord receiving split members 31A, 31B and the rear position of the other side portion respectively. Then, when the cord receiving split members 31A, 31B are coupled mutually to oppose to each other, the positioning convex portions 38A, 38B of the cord receiving split members 31A, 31B are inserted into the positioning concave portions 39A, 39B of the cord receiving split members 31A, 31B on the opposite side respectively, so that the relative positioning between the cord receiving split members 31A, 31B can be achieved.

The optical connector 10 constructed as above is assembled as described in the following.

Figure 2:
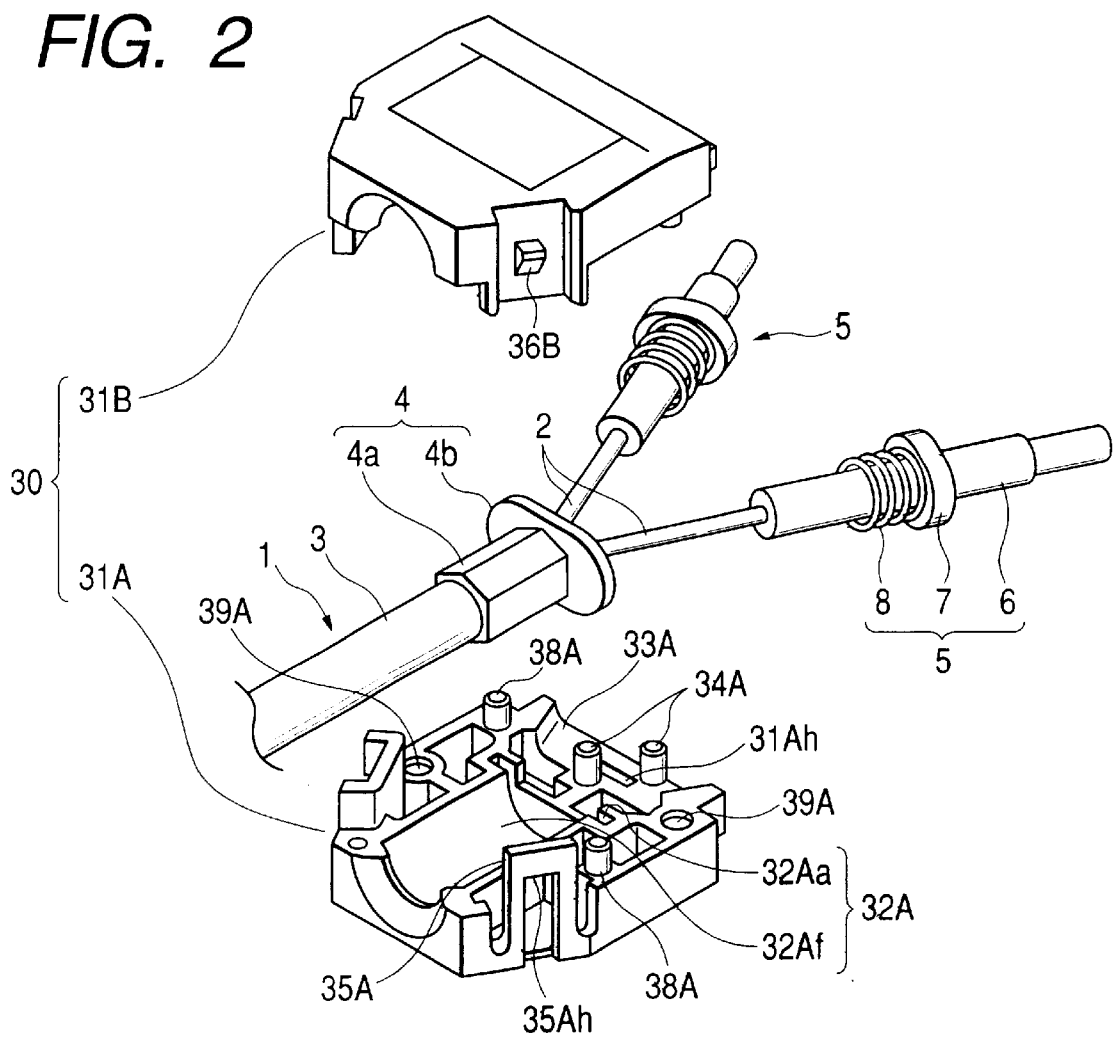
FIG. 2 is a perspective view showing an assembling step of the above optical connector.
Figure 3:
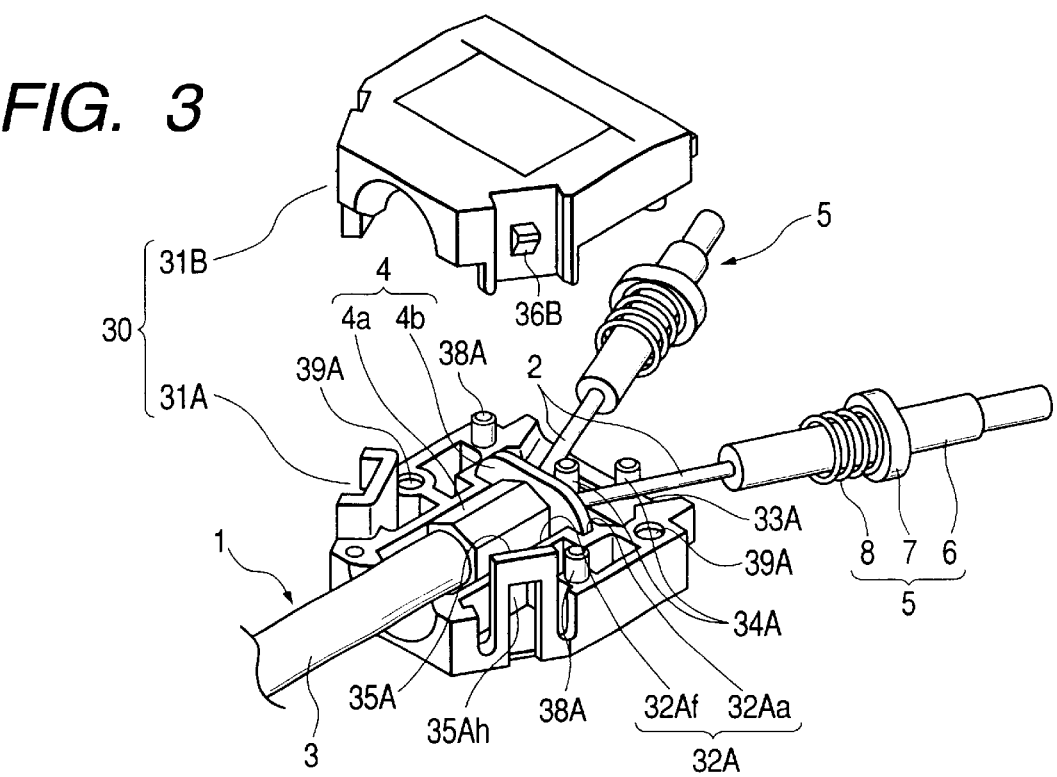
FIG. 3 is a perspective view showing another assembling step of the above optical connector.

First, as shown in FIG. 2, a pair of optical fiber cores 2 are exposed over a predetermined length by stripping off the covering member 3 at the end portion of the optical fiber cord 1, and the cord disconnection preventing jig 4 is fitted to the end portion of the covering member 3, and the ferrule portion 5 is fitted to the end portion of the optical fiber core 2. Then, the end portion of the covering member 3 of the optical fiber cord 1 is set in the cord holding concave portion 32A on the cord receiving split member 31A on one side by putting the guard portion 4b of the cord disconnection preventing jig 4 into the groove portion 32Aa of the cord holding concave portion 32A. At this time, a pair of optical fiber cores 2 extended to the end portion of the optical fiber cord 1 are guided to engage with a pair of guiding pins 34A formed in the cord receiving split member 31A from the outside, and then are branched like the Y-shape to separate a pair of optical fiber cores 2 into both sides. When a pair of cord receiving split members 31A, 31B are coupled with each other in this state, the end portions of the covering members 3 of the optical fiber cords 1 are installed in and held by the cord holding concave portion 32A, 32B and also a pair of optical fiber cores 2 exposed from the end portions of the optical fiber cords 1 are led in front of the cord receiving portion 30 to avoid the space between the holding-piece passing holes 31A*h*, 31B*h*. In this manner, the engaging convex portions 36A, 36B can engage with the engaging pieces 35A, 35B in the situation that the end portions of the covering members 3 of the optical fiber cords 1 are installed and held between the cord receiving split members 31A, 31B, and thus the cord receiving split members 31A, 31B can be coupled with each other.

Next, as shown in FIG. 4, when the rear end portions of the ferrule portions 5 are pushed into the concave portions 13 by inserting the top end portions of the ferrule portions 5 into the connecting cylindrical portions 18 from the inside of the housing casing portion 12, the ferrule portions 5 can be fitted and arranged in the housing casing portion 12 in the predetermined parallel manner. Then, when the front end portion of the cord receiving portion 30 is arranged in the rear opening of the housing casing portion 12 and then the housing lid portion 20 is fitted to close the upper opening of the housing casing portion 12, the ferrule portions 5 are installed and held in the housing main body portion 11 in the parallel fashion and also the holding pieces 22 are passed between the optical fiber cores 2 in the space formed between the core-guiding-path forming concave portions 33A, 33B from the holding-piece passing hole 31B*h* and then inserted into the holding-piece passing hole 31A*h*. Thus, the housing main body portion 11 and the cord receiving portion 30 can be held in their coupling state.

According to the optical connector constructed as above, a pair of guiding pins 34A, 34B that are provided to project toward the mutually-opposed core-guiding-path forming concave portions 33A, 33B and to guide a pair of optical fiber cores 2 extended from the top end portion of the optical fiber cord 1 to the positions at which they do not interfere with the holding pieces 22 are formed in the core-guiding-path forming concave portions 33A, 33B. Therefore, such a situation can be eliminated that the holding pieces 22 are pushed strongly against the optical fiber cores 2 in the assembling steps and accordingly the damage of the optical fiber cores 2 because of the pushing-down of the holding pieces 22 can be prevented.

In addition, the outer circular peripheral portions of their top end portions of the guiding pins 34A, 34B are chamfered. Therefore, even if the top end portions of the guiding pins 34A, 34B are brought into contact with the optical fiber cores 2 in the assembling, the optical fiber cores 2 can be easily moved to escape smoothly to the side portion and thus the damage of the optical fiber cores 2 can be prevented more firmly.

In particular, since a pair of guiding pins 34A, 34B in the core-guiding-path forming concave portions 33A, 33B are shifted in the longitudinal direction of the cord receiving portion 30, they can be formed at the positions at which they do not interfere with a pair of guiding pins 34A, 34B in the opposed core-guiding-path forming concave portions 33A, 33B. Therefore, since the above structure is employed and also the positions at which the engaging pieces 35A, 35B and the engaging convex portions 36A, 36B are formed and the positions at which the positioning convex portions 38A, 38B and the positioning concave portions 39A, 39B are formed are designed as described above, the cord receiving split members 31A, 31B can be formed to have the same shape and the same size. As a result, both the cord receiving split members 31A, 31B can be formed by using the same mold, and thus the production cost can be reduced.

Also, in this manner, the guiding pins 34A, 34B are formed at the positions at which they are shifted in the longitudinal direction of the cord receiving portion 30. Therefore, since the projection lengths of the guiding pins 34A, 34B can be set sufficiently large to reach the inner peripheral surfaces of the core-guiding-path forming concave portions 33A, 33B on the opposed destination side, the guiding pins 34A, 34B can guide more surely the optical fiber cores 2.

In the present embodiment, the holding pieces 22 are formed on the housing lid portion 20. But the holding pieces 22 may be formed on the housing casing portion 12 side.

As described above, according to the optical connector in the first aspect of the present invention, the housing main body portion includes a housing casing portion formed like a casing whose end side coupled to the cord receiving portion and upper side are opened and which can hold the pair of ferrule portions therein in the predetermined parallel manner, and a housing lid portion for closing an upper opening of the housing casing portion, whereby holding pieces formed on end sides of the housing casing portion or the housing lid portion coupled to the cord receiving portion are inserted into holding-piece passing holes formed in the cord receiving portion at positions between a pair of optical fiber cores that are led from the cord receiving portion to the housing main body portion such that a coupled state between the housing main body portion and the cord receiving portion is maintained, and the cord receiving portion includes a pair of cord receiving split members each having cord holding concave portions for receiving and holding an end portion of a covering portion of the optical fiber cord respectively and core-guiding- path forming concave portions for leading the pair of optical fiber cores, that are extended from a top end portion of the optical fiber cord received and held in the cord holding concave portions, to an outside, and the holding-piece passing holes into which the holding pieces are passed therethrough are formed at portions that correspond to the core-guiding-path forming concave portions in the cord receiving split members, and a pair of guiding pins for guiding the pair of optical fiber cores, that are extended from a top end portion of the optical fiber cord received and held in the cord holding concave portions, to positions not to interfere with the holding pieces, that are inserted into the holding-piece passing holes to pass through a space between the core-guiding-path forming concave portions, are provided to the core-guiding-path forming concave portions to protrude therefrom. Therefore, the situation that the holding pieces are pushed strongly against the optical fiber cores can be eliminated, and thus the damage of the optical fiber cores can be prevented.

Also, according to the second aspect of the invention, the pair of guiding pins in the core-guiding-path forming concave portions are formed at positions, that do not interfere with each other in a coupled state of the cord receiving split members by shifting them in a longitudinal direction of the cord receiving split members, and also have a height to reach inner peripheral surfaces of the core-guiding-path forming concave portions that oppose to each other in the coupled state of the cord receiving split members. Therefore, the optical fiber cord can be guided more surely, and also the cord receiving split members can be formed to have the same shape and the same size.

Also, according to the third aspect of the invention, structures having a same shape and a same size are employed as the pair of cord receiving split members. Therefore, the cord receiving split members can be formed easily by the same mold.

Also, according to the fourth aspect of the invention, outer peripheral portions of top end portions of the guiding pins are chamfered. Therefore, even if the top end portions of the guiding pins are brought into contact with the optical fiber cores, the optical fiber cores are moved slightly to escape to the side portion and thus the damage of the optical fiber cores can be prevented more firmly.

What is claimed is:

1. An optical connector comprising:

a housing main body portion for installing and holding a pair of ferrule portions fitted to top end portions of a pair of optical fiber cores, which are exposed from a top end portion of a two-core optical fiber cord, respectively in a predetermined parallel manner; and a cord receiving portion coupled to a base end side of the housing main body portion, for holding an end portion of a covering member of the optical fiber cord, wherein the housing main body portion includes a housing casing portion formed like a casing whose end side coupled to the cord receiving portion and upper side are opened and which can hold the pair of ferrule portions therein in the predetermined parallel manner, and a housing lid portion for closing an upper opening of the housing casing portion, whereby holding pieces formed on end sides of the housing casing portion or the housing lid portion coupled to the cord receiving portion are inserted into holding-piece passing holes formed in the cord receiving portion at positions between a pair of optical fiber cores that are led from the cord receiving portion to the housing main body portion such that a coupled state between the housing main body portion and the cord receiving portion is maintained, and wherein the cord receiving portion includes a pair of cord receiving split members each having cord holding concave portions for receiving and holding an end portion of a covering portion of the optical fiber cord respectively and core-guiding-path forming concave portions for leading the pair of optical fiber cores, that are extended from a top end portion of the optical fiber cord received and held in the cord holding concave portions, to an outside, and the holding-piece passing holes into which the holding pieces are passed therethrough are formed at portions that correspond to the core-guiding-path forming concave portions in the cord receiving split members; and a pair of guiding pins for guiding the pair of optical fiber cores, that are extended from a top end portion of the optical fiber cord received and held in the cord holding concave portions, to positions not to interfere with the holding pieces, that are inserted into the holding-piece passing holes to pass through a space between the core-guiding-path forming concave portions, are provided to the core-guiding-path forming concave portions to protrude therefrom.

2. The optical connector according to claim 1, wherein the pair of guiding pins in the core-guiding-path forming concave portions are formed at positions, that do not interfere with each other in a coupled state of the cord receiving split members by shifting them in a longitudinal direction of the cord receiving split members, and also have a height to reach inner peripheral surfaces of the core- guiding-path forming concave portions that oppose to each other in the coupled state of the cord receiving split members.

3. The optical connector according to claim 1, wherein structures having a same shape and a same size are employed as the pair of cord receiving split members.

4. The optical connector according to claim 1, wherein outer peripheral portions of top end portions of the guiding pins are chamfered.

* * * * *